(12) United States Patent
Ma et al.

(10) Patent No.: US 12,521,480 B2
(45) Date of Patent: Jan. 13, 2026

(54) NEGATIVE-PRESSURE SPUTUM SUCTION DEVICE CAPABLE OF INTERMITTENTLY SUCKING SPUTUM FOR THE PNEUMOLOGY DEPARTMENT

(71) Applicant: GUANGDONG GUOSHIJIAN TECHNOLOGY DEVELOPMENT CO., LTD., Guangdong (CN)

(72) Inventors: Wei Ma, Guangdong (CN); Jiasheng Huang, Guangdong (CN)

(73) Assignee: GUANGDONG GUOSHIJIAN TECHNOLOGY DEVELOPMENT CO., LTD, Foshan (CN)

( * ) Notice: Subject to any disclaimer, the term of this patent is extended or adjusted under 35 U.S.C. 154(b) by 515 days.

(21) Appl. No.: 18/033,427

(22) PCT Filed: Dec. 30, 2021

(86) PCT No.: PCT/CN2021/143146
§ 371 (c)(1),
(2) Date: Apr. 24, 2023

(87) PCT Pub. No.: WO2023/123224
PCT Pub. Date: Jul. 6, 2023

(65) Prior Publication Data
US 2024/0374806 A1    Nov. 14, 2024

(30) Foreign Application Priority Data
Dec. 27, 2021 (CN) .......................... 202111608980.X (51) Int. Cl.
*A61M 1/00* (2006.01)
*A61M 11/02* (2006.01)

(52) U.S. Cl.
CPC ................ *A61M 1/75* (2021.05); *A61M 1/77* (2021.05); *A61M 11/02* (2013.01); *A61M 2202/0466* (2013.01); *A61M 2205/7536* (2013.01); *A61M 2210/1025* (2013.01)

(58) Field of Classification Search
CPC .......... A61M 1/75; A61M 1/77; A61M 11/02; A61M 2202/0466; A61M 2205/7536; A61M 2210/1025
See application file for complete search history.

(56) References Cited

U.S. PATENT DOCUMENTS

2005/0159716 A1* 7/2005 Kobayashi .............. A61M 1/82
604/317

* cited by examiner

*Primary Examiner* — Dung T Ulsh (57) ABSTRACT

A negative-pressure sputum suction device capable of intermittently sucking sputum includes a box body, an intermittent negative pressure mechanism, an atomization mechanism, a negative pressure pipe, a ventilation frame, a filter screen, a collection mechanism, a box door, an anti-skid leg and a conveying pipe; the intermittent negative pressure mechanism is arranged in the box body, the atomization mechanism is arranged in the box body, and the negative pressure pipe is fixedly connected to the box body; the ventilation frame is fixedly connected to the box body, the filter screen is fixedly connected to the ventilation frame, the collection mechanism is arranged on the outer side of the box body, and the box door is hinged to the box body; four evenly-distributed anti-skid legs are fixedly connected to the box body, and the conveying pipe is fixedly connected to the box body.

8 Claims, 7 Drawing Sheets

NEGATIVE-PRESSURE SPUTUM SUCTION DEVICE CAPABLE OF INTERMITTENTLY SUCKING SPUTUM FOR THE PNEUMOLOGY DEPARTMENT

TECHNICAL FIELD

This invention generally relates to the technical field of sputum suction devices, and more particularly, to a negative-pressure sputum suction device capable of intermittently sucking sputum for the pneumology department of a hospital.

BACKGROUND

In the pneumology department, certain patients have breathing difficulties due to excessive sputum production. Their lives might be seriously threatened by if the sputum is not removed from their body timely. Manual sputum suction devices often do not have sufficient suction power, resulting in poor effect of sputum suction. During the suction process, injuries can be easily caused by inserting a rubber pipe into a patient's respiratory passage, and the inflammation phenomenon caused by the injuries of the inner wall of the respiratory passage might lead to harder breathing and more difficult discharge of sputum. Therefore, sputum in a patient's respiratory passage needs to be removed by using a sputum suction device. However, conventional sputum suction devices have the following shortcomings: first, the conventional devices operate continuously and do not have the ability to conduct an intermittent suction; second, when the sputum is sticky, the devices often fail to operate smoothly. Therefore, it is urgent for those skilled in the art to provide a negative-pressure sputum suction device capable of intermittently sucking sputum for the pneumology department.

SUMMARY

The purpose of the present invention is to provide a negative-pressure sputum suction device capable of intermittently sucking sputum for the pneumology department.

To achieve the above purpose, the present invention adopts the following technical solution:

A negative-pressure sputum suction device capable of intermittently sucking sputum for the pneumology department comprising a box body, an intermittent negative pressure mechanism, an atomization mechanism, a negative pressure pipe, a ventilation frame, a filter screen, a collection mechanism, a box door, an anti-skid leg and a conveying pipe; the intermittent negative pressure mechanism is arranged in the box body, the atomization mechanism is arranged in the box body, and the negative pressure pipe is fixedly connected to the box body; the ventilation frame is fixedly connected to the box body, the filter screen is fixedly connected to the ventilation frame, the collection mechanism is arranged on the outer side of the box body, and the box door is hinged to the box body; four evenly-distributed anti-skid legs are fixedly connected to the box body, and the conveying pipe is fixedly connected to the box body.

In another preferred embodiment of the present invention, the intermittent negative pressure mechanism comprises a negative pressure box, a negative pressure pump, a connecting pipe, a through hole, a sealing plug, a guide cylinder, a guide rod, a tension spring and a connecting rod. The negative pressure box is fixedly connected to the interior of the box body, the negative pressure pump is fixedly connected to the negative pressure box, and the input end of the negative pressure pump is fixedly connected to the negative pressure box. The negative pressure box is fixedly connected to the negative pressure pipe, the connecting pipe is fixedly connected to an outer side of the negative pressure pipe, the through hole is formed in the connecting pipe, and the sealing plug is slidably connected to the interior of the connecting pipe. Two symmetrically distributed guide cylinders are fixedly connected to the interior of the negative pressure box, the guide rod is slidably connected to the interior of the guide cylinder, and the tension spring is arranged inside the guide rod. The connecting rod is fixedly connected to an outer side of the guide rod, the connecting rod is fixedly connected to the sealing plug, and the connecting pipe is in contact with the negative pressure box.

In another preferred embodiment of the present invention, one end of the tension spring is fixedly connected to the guide rod, and the other end of the tension spring is fixedly connected to the guide cylinder.

In another preferred embodiment of the present invention, the atomization mechanism comprises a liquid storage tank, a partition plate, an atomizer, an atomization pipe, an atomization box, a flow guide pump and a water feeding pipe. The liquid storage box is fixedly connected to the interior of the box body, and the partition plate is fixedly connected to the interior of the liquid storage box. The atomizer is fixedly connected to the partition plate, the atomization box is fixedly connected to the partition plate, and the flow guide pump is fixedly connected to the atomization box. The flow guide pump is fixedly connected to the conveying pipe, the water feeding pipe is fixedly connected to the liquid storage box, and the water feeding pipe is fixedly connected to the box body.

In another preferred embodiment of the present invention, the atomization box is fixedly connected to the output end of the atomizer, and the atomization box is fixedly connected to the input end of the flow guide pump.

In another preferred embodiment of the present invention, the collection mechanism comprises a bracket, a collection cylinder, a cylinder cover, a supporting pipe, a connecting cover, a connecting block, a sputum suction pipe, a limiting cover, a rubber sleeve and a positioning column. The bracket is fixedly connected to an outer side of the box body, the collection cylinder is slidably connected to the interior of the bracket, and the cylinder cover is connected to the collection cylinder through threads. The supporting pipe is fixedly connected to the interior of the cylinder cover, the connecting cover is fixedly connected to an outer side of the supporting pipe, and the connecting cover is fixedly connected to the conveying pipe. The connecting block is slidably connected to the interior of the connecting cover, the sputum suction pipe is fixedly connected to the connecting block, and the rubber sleeve is fixedly connected to the interior of the bracket. The rubber sleeve is in contact with the collection cylinder, and the negative pressure pipe is fixedly connected to the cylinder cover.

In another preferred embodiment of the present invention, the limiting cover is movably connected to an outer side of the sputum suction pipe, the limiting cover is in threaded connection with the connecting cover, and the limiting cover is in contact with the connecting block.

In another preferred embodiment of the present invention, a positioning post is fixedly connected to the bracket, and the positioning post is slidably connected to the collection cylinder.

Compared with the prior art, the present invention has the following advantages:

The present invention provides a negative-pressure sputum suction device capable of intermittently sucking sputum for the pneumology department; through adopting the present invention, intermittent sputum suction and sputum softening are achieved; in specific use, compared with traditional negative-pressure sputum suction devices, the device of the present invention achieves the following benefits:

First, through arranging the tension spring, the sealing plug, the connecting pipe and other structures in the negative pressure box, during use, when the pressure in the negative pressure box reaches the elastic force of the tension spring, the sealing plug moves downwards, and the pressure allows the air in the negative pressure pipe to be sucked into the negative pressure box through the through hole; when the air is sucked into the negative pressure box, the pressure in the negative pressure box recovers, and the tension spring propels the sealing plug to seal the connecting pipe under the pulling force such that the intermittent suction is realized;

Second, through arranging the atomization mechanism in the box body, when performing the sputum suction, the sputum is softened and diluted through the flow guide pump in the atomization mechanism, making the sputum suction easier and more convenient.

BRIEF DESCRIPTION OF THE DRAWINGS

For ease of illustration, the present invention is described in detail by the following embodiments and drawings.

In Figures: 1—Box Body, 2—Intermittent Negative Pressure Mechanism, 3—Atomization Mechanism, 4—Negative Pressure Pipe, 5—Ventilation Frame, 6—Filter Screen, 7—Collection Mechanism, 8—Box Door, 9—Anti—skid Leg, 10—Conveying Pipe, 21—Negative Pressure Box, 22—Negative Pressure Pump, 23—Connecting Pipe, 24—Through Hole, 25—Sealing Plug, 26—Guide Cylinder, 27—Guide Rod, 28—Tension Spring, 29—Connecting Rod, 31—Liquid Storage Tank, 32—Partition Plate, 33—Atomizer, 34—Atomization Pipe, 35—Atomization Box, 36—Flow Guide Pump, 37—Water Feeding Pipe, 71—Bracket, 72—Collection Cylinder, 73—Cylinder Cover, 74—Supporting Pipe, 75—Connecting Cover, 76—Connecting Block, 77—Sputum Suction Pipe, 78—Limiting Cover, 79—Rubber Sleeve, 70—Positioning Post.

DETAILED DESCRIPTION

As shown in FIGS. 1-7, the embodiment of the present invention adopts the following technical solution:

Embodiment 1

Figure 1:
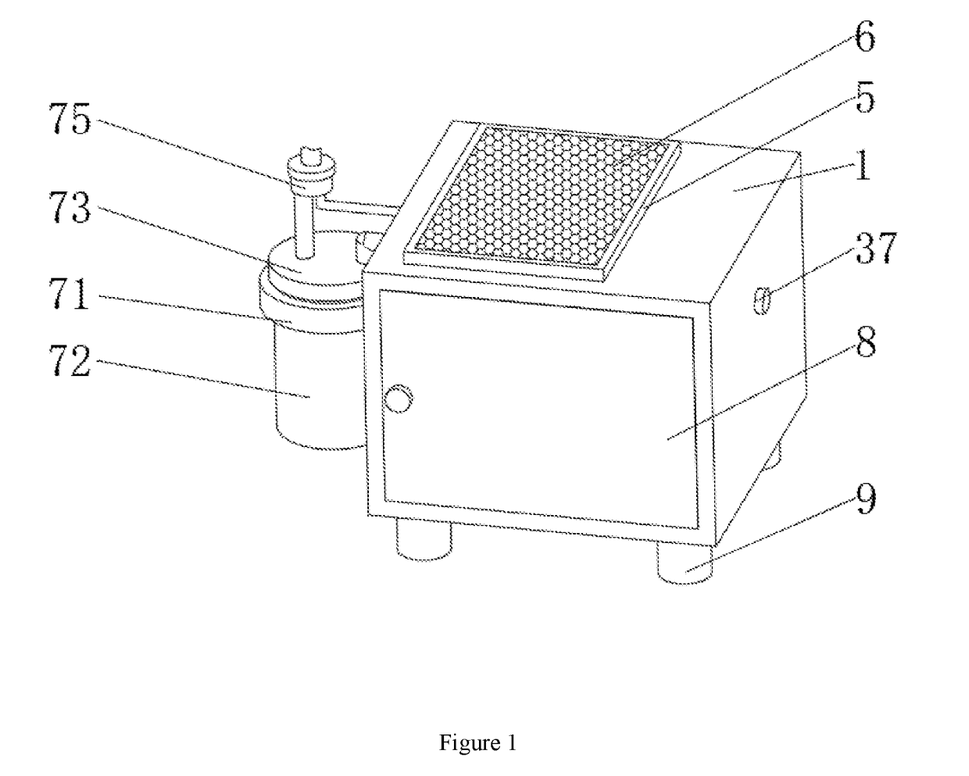
FIG. 1 is a schematic diagram illustrating an overall three-dimensional structure of the present invention.
Figure 2:
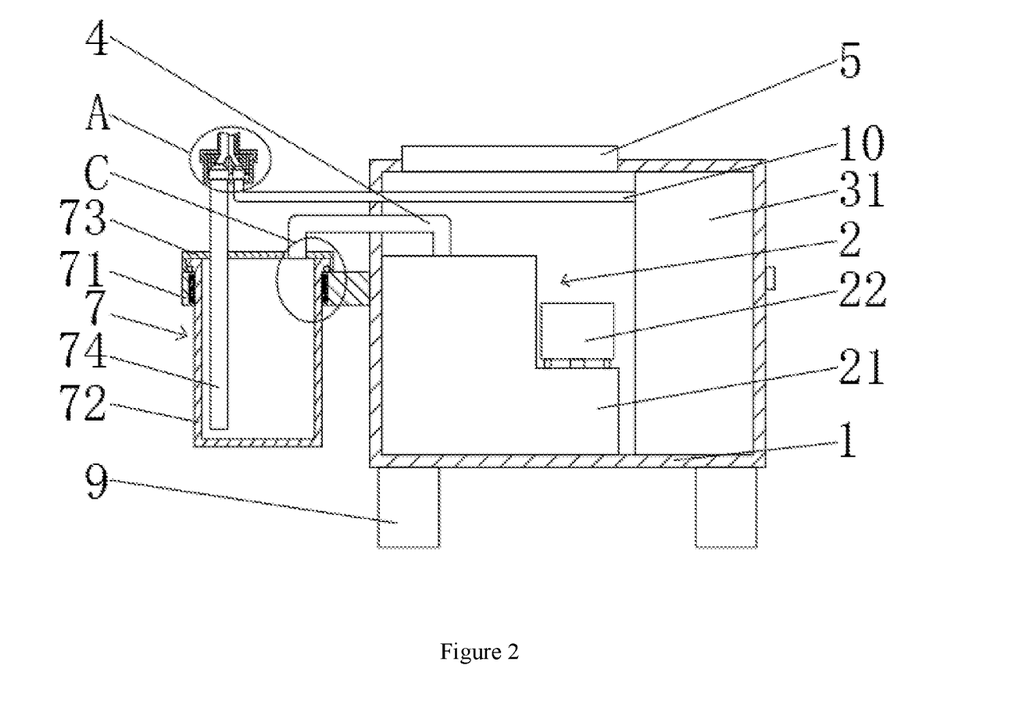
FIG. 2 is a schematic diagram illustrating a front sectional view of the present invention in FIG. 1.

The negative-pressure sputum suction device capable of intermittently sucking sputum for the pneumology department of the present invention comprises a box body 1, an intermittent negative pressure mechanism 2, an atomization mechanism 3, a negative pressure pipe 4, a ventilation frame 5, a filter screen 6, a collection mechanism 7, a box door 8, an anti-skid leg 9 and a conveying pipe 10. The intermittent negative pressure mechanism 2 is arranged in the box body 1, the atomization mechanism 3 is arranged in the box body 1, and the negative pressure pipe 4 is fixedly connected to the box body 1. The ventilation frame 5 is fixedly connected to the box body 1, the filter screen 6 is fixedly connected to the ventilation frame 5, the collection mechanism 7 is arranged on the outer side of the box body 1, and the box door 8 is hinged to the box body 1. Four evenly-distributed anti-skid legs 9 are fixedly connected to the box body 1, the conveying pipe 10 is fixedly connected to the box body 1, and the conveying pipe 10 is made of an elastic material.

Figure 3:
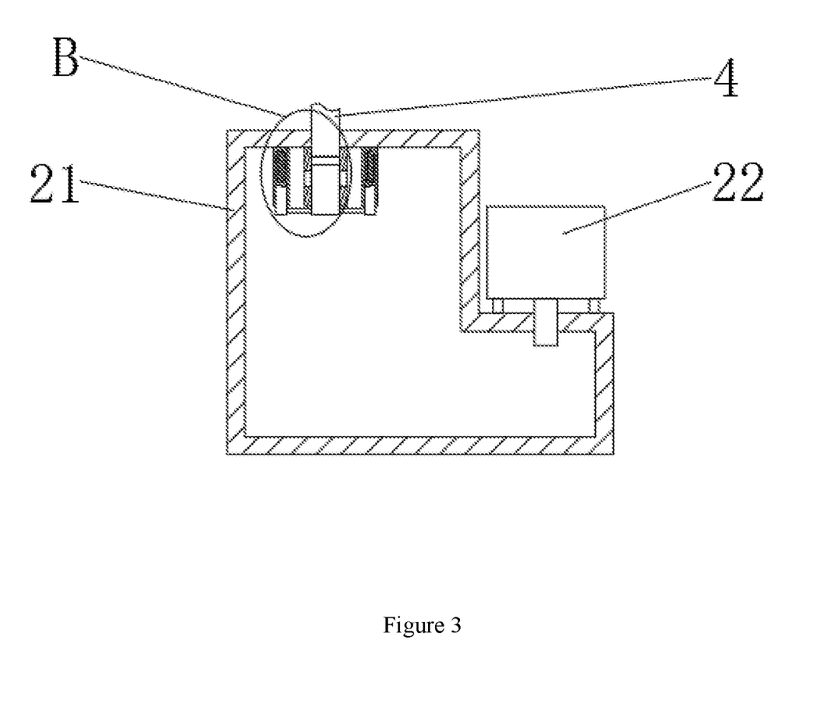
FIG. 3 is a schematic diagram illustrating a sectional view of the negative pressure box of the present invention in FIG. 2.
Figure 6:
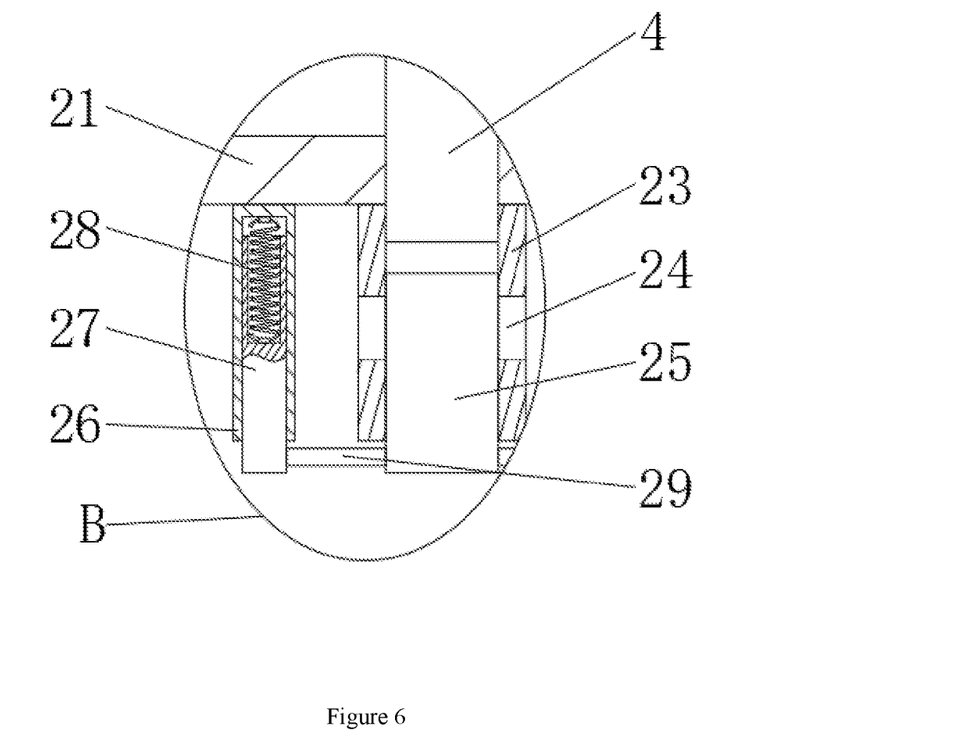
FIG. 6 is a schematic diagram illustrating an enlarged structure of portion B in FIG. 3.

Further, the intermittent negative pressure mechanism 2 comprises a negative pressure box 21, a negative pressure pump 22, a connecting pipe 23, a through hole 24, a sealing plug 25, a guide cylinder 26, a guide rod 27, a tension spring 28 and a connecting rod 29. The negative pressure box 21 is fixedly connected to the interior of the box body 1, the negative pressure pump 22 is fixedly connected to the negative pressure box 21, and the input end of the negative pressure pump 22 is fixedly connected to the negative pressure box 21. The negative pressure box 21 is fixedly connected to the negative pressure pipe 4, the connecting pipe 23 is fixedly connected to an outer side of the negative pressure pipe 4, the through hole 24 is formed in the connecting pipe 23, and the sealing plug 25 is slidably connected to the interior of the connecting pipe 23. Two symmetrically distributed guide cylinders 26 are fixedly connected to the interior of the negative pressure box 21, the guide rod 27 is slidably connected to the interior of the guide cylinder 26, and the tension spring 28 is arranged inside the guide rod 27. The connecting rod 29 is fixedly connected to an outer side of the guide rod 27, the connecting rod 29 is fixedly connected to the sealing plug 25, the connecting pipe 23 is in contact with the negative pressure box 21, and the negative pressure pipe 4 is an elastic pipe.

One end of the tension spring 28 is fixedly connected to the guide rod 27, the other end of the tension spring 28 is fixedly connected to the guide cylinder 26, and the tension spring 28 is capable of propelling the sealing plug 25 to automatically reset through the elastic force.

Figure 4:
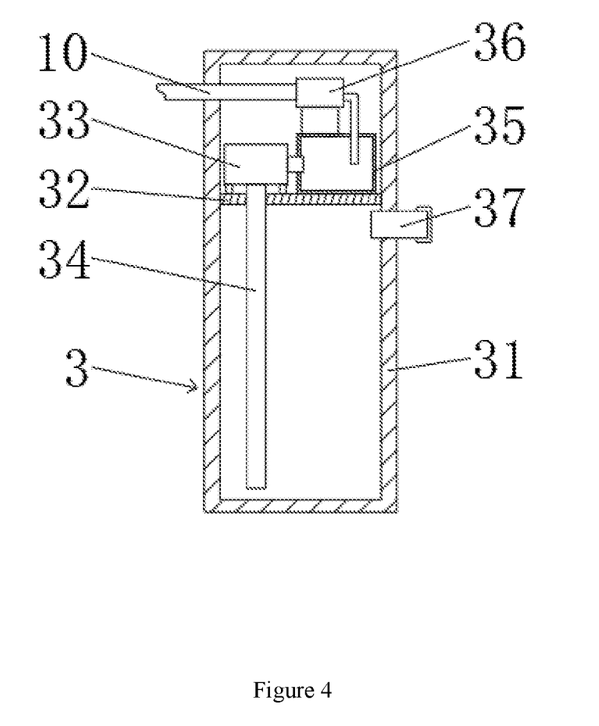
FIG. 4 is a schematic diagram illustrating a sectional view of the liquid storage tank of the present invention in FIG. 2.

The atomization mechanism 3 comprises a liquid storage tank 31, a partition plate 32, an atomizer 33, an atomization pipe 34, an atomization box 35, a flow guide pump 36 and a water feeding pipe 37. The liquid storage box 31 is fixedly connected to the interior of the box body 1, and the partition plate 32 is fixedly connected to the interior of the liquid storage box 31. The atomizer 33 is fixedly connected to the partition plate 32, the atomization box 35 is fixedly connected to the partition plate 32, and the flow guide pump 36 is fixedly connected to the atomization box 35. The flow guide pump 36 is fixedly connected to the conveying pipe 10, the water feeding pipe 37 is fixedly connected to the liquid storage box 31, and the water feeding pipe 37 is fixedly connected to the box body 1. The atomizer 33 is capable of atomizing the liquid in the liquid storage box 31.

The atomization box 35 is fixedly connected to the output end of the atomizer 33, the atomization box 35 is fixedly connected to the input end of the flow guide pump 36, and the atomization box 35 is capable of storing the atomized liquid produced by the atomizer 33.

Figure 5:
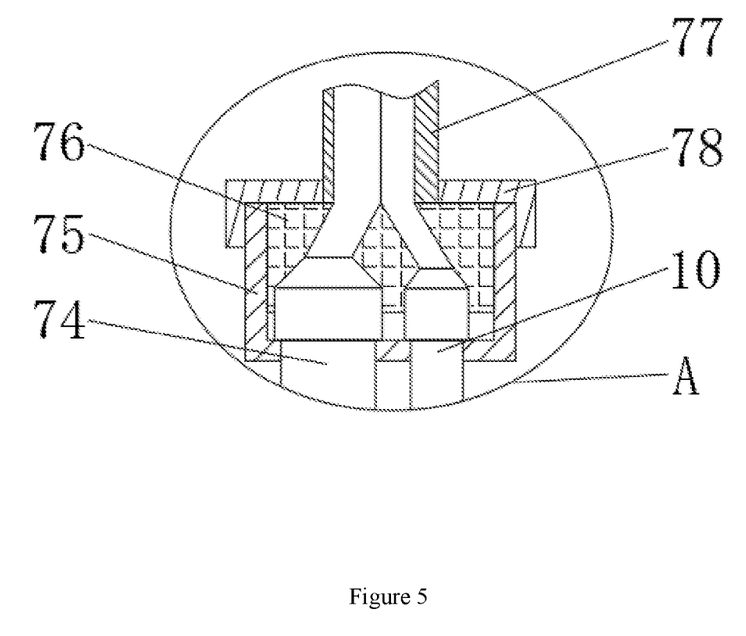
FIG. 5 is a schematic diagram illustrating an enlarged structure of portion A in FIG. 2.
Figure 7:
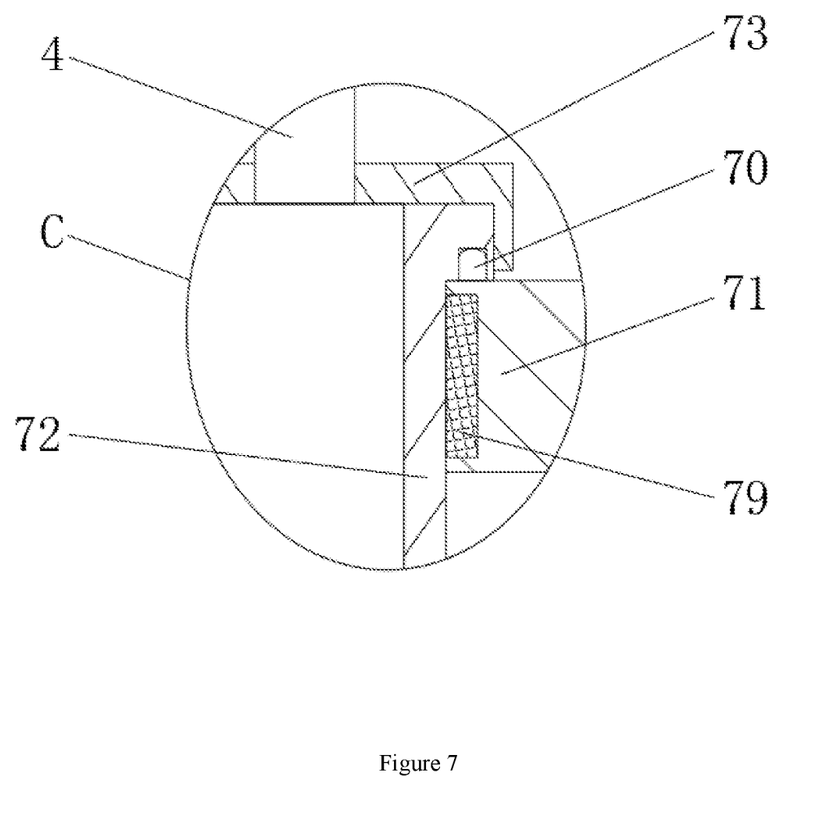
FIG. 7 is a schematic diagram illustrating an enlarged structure of portion C in FIG. 2.

The collection mechanism 7 comprises a bracket 71, a collection cylinder 72, a cylinder cover 73, a supporting pipe 74, a connecting cover 75, a connecting block 76, a sputum suction pipe 77, a limiting cover 78, a rubber sleeve 79 and a positioning column 70. The bracket 71 is fixedly connected to an outer side of the box body 1, the collection cylinder 72 is slidably connected to the interior of the bracket 71, and the cylinder cover 73 is connected to the collection cylinder 72 through threads. The supporting pipe 74 is fixedly connected to the interior of the cylinder cover 73, the connecting cover 75 is fixedly connected to an outer side of the supporting pipe 74, and the connecting cover 75 is fixedly connected to the conveying pipe 10. The connecting block 76 is slidably connected to the interior of the connecting cover 75, the sputum suction pipe 77 is fixedly connected to the connecting block 76, and the rubber sleeve 79 is fixedly connected to the interior of the bracket 71. The rubber sleeve 79 is in contact with the collection cylinder 72, the negative pressure pipe 4 is fixedly connected to the cylinder cover 73, and the interior of the sputum suction pipe 77 is divided into two pipelines for sucking and spraying out the atomized liquid.

The limiting cover 78 is movably connected to an outer side of the sputum suction pipe 77, the limiting cover 78 is in threaded connection with the connecting cover 75, the limiting cover 78 is in contact with the connecting block 76, and the limiting cover 78 is capable of limiting the connecting block 76.

A positioning post 70 is fixedly connected to the bracket 71, and the positioning post 70 is slidably connected to the collection cylinder 72. The positioning post 70 is capable of preventing the collection cylinder 72 from rotating.

When in use, the sputum suction pipe 77 is inserted into a patient's nasal cavity, then the negative pressure pump 22 is initiated to suck the air in the interior of the negative pressure box 21. In this way, the pressure in the negative pressure box 21 is reduced. After the pressure is reduced to a certain degree, the sealing plug 25 slides towards the outer side of the connecting pipe 23, and the tension spring 28 is stretched by means of the guide rod 27. After the sealing plug 25 escapes from the through hole 24, the pressure in the negative pressure box 21 is transferred to the interior of the negative pressure pipe 4, and after the pressure is transferred through the connecting pipe 23, the pressure in the negative pressure box 21 is significantly reduced. At this point, the tension spring 28 is reset. The tension spring 28 propels the sealing plug 25 to block the through hole 24 under the elastic force, and when the pressure value reaches the elastic value of the tension spring 28 again, the suction force is transferred to the interior of the negative pressure pipe 4 again, so that an intermittent suction is realized.

The pressure in the negative pressure pipe 4 allows the suction force to be transferred to the interior of the sputum suction pipe 77 through the collection cylinder 72 such that the sputum suction is achieved. During the suction, the atomizer 33 is initiated to atomizes the sterile water in the liquid storage tank 31 through the atomizing pipe 34 and discharges the sterile water into the atomizing box 35. Subsequently, the flow guide pump 36 is initiated to discharge the atomized sterile water into the sputum suction pipe 77 through the conveying pipe 10, so that the sputum is softened and diluted. In this way, the sputum suction becomes easier and more convenient.

The basic principles, main features and advantages of the present invention are described in the above. Those skilled in the art should understand that the present invention is not limited by the above embodiments. The above embodiments and instructions are merely used to describe the principle of the present invention. Various modifications and improvements may be made by those skilled in the art without departing from the spirit of the present invention, and all of which shall therefore fall into the scope of the present invention. The scope of the present invention is defined by the claims of the present invention.

The invention claimed is:

1. A negative-pressure sputum suction device capable of intermittently sucking sputum, comprising:
    a box body (1),
    an intermittent negative pressure mechanism (2),
    an atomization mechanism (3),
    a negative pressure pipe (4),
    a ventilation frame (5),
    a filter screen (6),
    a collection mechanism (7),
    a box door (8),
    a plurality of anti-skid leg (9), and
    a conveying pipe (10),
    wherein the intermittent negative pressure mechanism (2) is arranged in the box body (1), wherein the atomization mechanism (3) is arranged in the box body (1), wherein the negative pressure pipe (4) is fixedly connected to the box body (1), wherein the ventilation frame (5) is fixedly connected to the box body (1), wherein the filter screen (6) is fixedly connected to the ventilation frame (5), wherein the collection mechanism (7) is arranged on the outer side of the box body (1), wherein the box door (8) is hinged to the box body (1), wherein the plurality of anti-skid legs (9) are fixedly connected to the box body (1), and wherein the conveying pipe (10) is fixedly connected to the box body (1).

2. The negative-pressure sputum suction device capable of intermittently sucking sputum of claim 1, wherein the intermittent negative pressure mechanism (2) further comprising:
    a negative pressure box (21), a negative pressure pump (22), a connecting pipe (23), a through hole (24), a sealing plug (25), a guide cylinder (26), a guide rod (27), a tension spring (28) and a connecting rod (29), wherein the negative pressure box (21) is fixedly connected to an interior of the box body (1), wherein the negative pressure pump (22) is fixedly connected to the negative pressure box (21), wherein an input end of the negative pressure pump (22) is fixedly connected to the negative pressure box (21), wherein the negative pressure box (21) is fixedly connected to the negative pressure pipe (4), wherein the connecting pipe (23) is fixedly connected to an outer side of the negative pressure pipe (4), wherein the through hole (24) is formed in the connecting pipe (23), wherein the sealing plug (25) is slidably connected to an interior of the connecting pipe (23), wherein two symmetrically distributed guide cylinders (26) are fixedly connected to an interior of the negative pressure box (21), wherein the guide rod 27 is slidably connected to an interior of the guide cylinder (26), wherein the tension spring (28) is arranged inside the guide rod (27), wherein the connecting rod (29) is fixedly connected to an outer side of the guide rod (27), wherein the connecting rod (29) is fixedly connected to the sealing plug (25), and the connecting pipe (23) is in contact with the negative pressure box (21).

3. The negative-pressure sputum suction device capable of intermittently sucking sputum of claim 2, wherein one end of the tension spring (28) is fixedly connected to the guide rod (27), and another end of the tension spring (28) is fixedly connected to the guide cylinder (26).

4. The negative-pressure sputum suction device capable of intermittently sucking sputum of claim 1, wherein the atomization mechanism (3) further comprising:
   a liquid storage tank (31), a partition plate (32), an atomizer (33), an atomization pipe (34), an atomization box (35), a flow guide pump (36) and a water feeding pipe (37), wherein the liquid storage box (31) is fixedly connected to the interior of the box body (1), wherein the partition plate (32) is fixedly connected to the interior of the liquid storage box (31), wherein the atomizer (33) is fixedly connected to the partition plate (32), wherein atomization box (35) is fixedly connected to the partition plate (32), wherein the flow guide pump (36) is fixedly connected to the atomization box (35), wherein the flow guide pump (36) is fixedly connected to the conveying pipe (10), wherein the water feeding pipe (37) is fixedly connected to the liquid storage box (31), and wherein the water feeding pipe (37) is fixedly connected to the box body (1).

5. The negative-pressure sputum suction device capable of intermittently sucking sputum of claim 4, wherein the atomization box (35) is fixedly connected to an output end of the atomizer (33), and wherein the atomization box (35) is fixedly connected to an input end of the flow guide pump (36).

6. The negative-pressure sputum suction device capable of intermittently sucking sputum of claim 1, wherein the collection mechanism (7) further comprising:
   a bracket (71), a collection cylinder (72), a cylinder cover (73), a supporting pipe (74), a connecting cover (75), a connecting block (76), a sputum suction pipe (77), a limiting cover (78), a rubber sleeve (79) and a positioning column (70), wherein the bracket (71) is fixedly connected to an outer side of the box body (1), wherein the collection cylinder (72) is slidably connected to an interior of the bracket (71), wherein the cylinder cover (73) is connected to the collection cylinder (72) through threads, wherein the supporting pipe (74) is fixedly connected to an interior of the cylinder cover (73), wherein the connecting cover (75) is fixedly connected to an outer side of the supporting pipe (74), wherein the connecting cover (75) is fixedly connected to the conveying pipe (10), wherein the connecting block (76) is slidably connected to an interior of the connecting cover (75), wherein the sputum suction pipe (77) is fixedly connected to the connecting block (76), and wherein the rubber sleeve (79) is fixedly connected to an interior of the bracket (71), wherein the rubber sleeve (79) is in contact with the collection cylinder (72), and wherein the negative pressure pipe (4) is fixedly connected to the cylinder cover (73).

7. The negative-pressure sputum suction device capable of intermittently sucking sputum of claim 6, wherein the limiting cover (78) is movably connected to an outer side of the sputum suction pipe (77), wherein the limiting cover (78) is in threaded connection with the connecting cover (75), and wherein the limiting cover (78) is in contact with the connecting block (76).

8. The negative-pressure sputum suction device capable of intermittently sucking sputum of claim 1, wherein a positioning post (70) is fixedly connected to the bracket (71), and wherein the positioning post (70) is slidably connected to the collection cylinder (72).

\* \* \* \* \*